Figure 1:
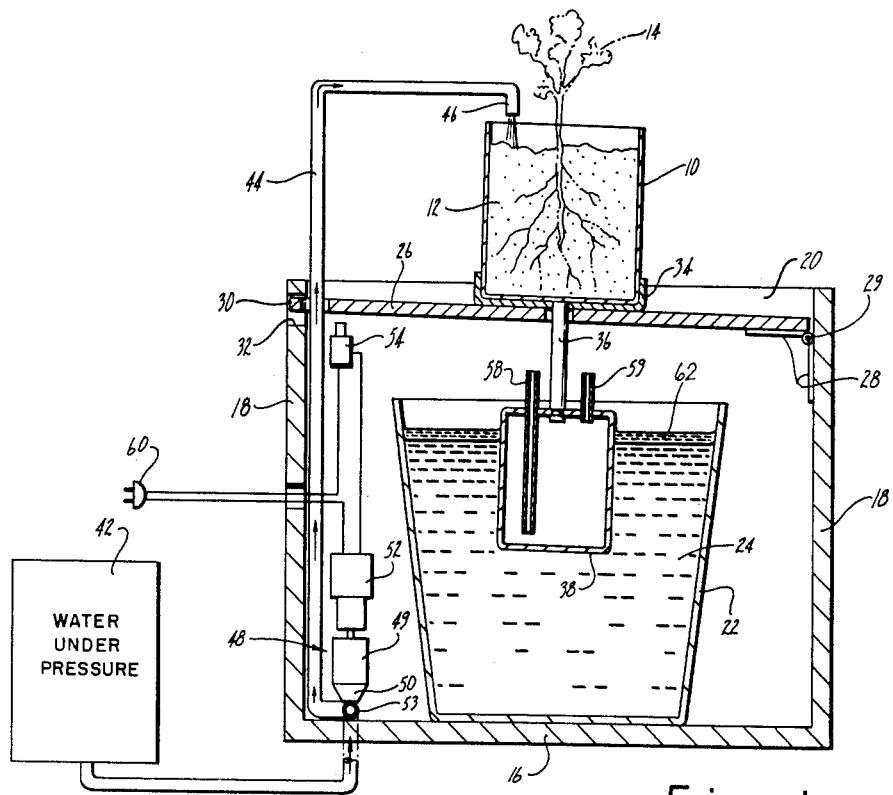

Feb. 9, 1965    F. Z. PATASSY    3,168,797
AUTOMATIC WATERING DEVICE
Filed May 2, 1963

INVENTOR.
Frank Z. Patassy
BY
Attorneys

United States Patent Office 3,168,797
Patented Feb. 9, 1965

3,168,797
AUTOMATIC WATERING DEVICE
Frank Z. Patassy, San Francisco, Calif., assignor to International Agricultural Services, Inc., San Francisco, Calif., a corporation of California
Filed May 2, 1963, Ser. No. 277,501
3 Claims. (Cl. 47—38)

This invention relates generally to automatic watering devices, and more particularly to devices of this type for continuously and automatically maintaining soil samples at a desired predetermined moisture content.

In agricultural experiments, for example, to test the nutrient value of different samples of soil, it is frequently desirable to maintain the test soil sample at a predetermined, substantially uniform moisture content. Such experiments are customarily performed in conjunction with a test crop (e.g., barley, alfalfa, etc.) which is planted in the various samples of soil, and which must be watered at regular intervals to insure a desired rate of growth of the plants. Heretofore, agricultural experiments of this type have required constant laboratory attendance to insure continued growth of the test crop as well as maintenance of substantially uniform conditions for each of the tested samples. To illustrate, the samples are normally moved in rotation about the test area, at regular intervals and according to a predetermined plan. This insures that each plant will be exposed to substantially uniform conditions of sun, temperature, shade, and so on. It is also essential that each plant be maintained at a substantially uniform moisture content. To date, however, no truly satisfactory system has been devised for automatically watering test samples of this type, nor for insuring the maintenance of substantially uniform conditions of moisture throughout the test period.

Maintenance of uniform conditions in agricultural experiments also requires that no contaminants be introduced to the test samples. A principal source of such contamination is the water supply, which frequently will contain or pick up trace amounts of chemicals, minerals, bacteria or plant spores, and like contaminants which destroy the accuracy of the test. Under typical conditions, where the plants are watered at irregular intervals by a laboratory technician, maintenance of sterile conditions is a difficult, tedious, if not impossible, task.

In general, the object of the present invention is to provide a simple solution to the above and to additional problems as will appear, and to provide a watering device or system by which substantially uniform moisture conditions can be continuously and automatically maintained, with a minimum of supervision.

Another object of the invention is to provide a simple device for automatically maintaining a test sample of soil at a predetermined moisture content.

Another object of the invention is to provide a device for automatically supplying water to test specimens (e.g., plants, crops, etc.) which makes possible the use of a sterile, uncontaminated water source.

Another object of the invention is to provide an automatic watering device which can be quickly and easily sterilized, and which can be maintained under completely sterile conditions with a minimum of supervision.

Another object of the invention is to provide an automatic watering device of the above character which is simple in construction, easily and inexpensively manufactured, and trouble-free in operation.

Figure 2:
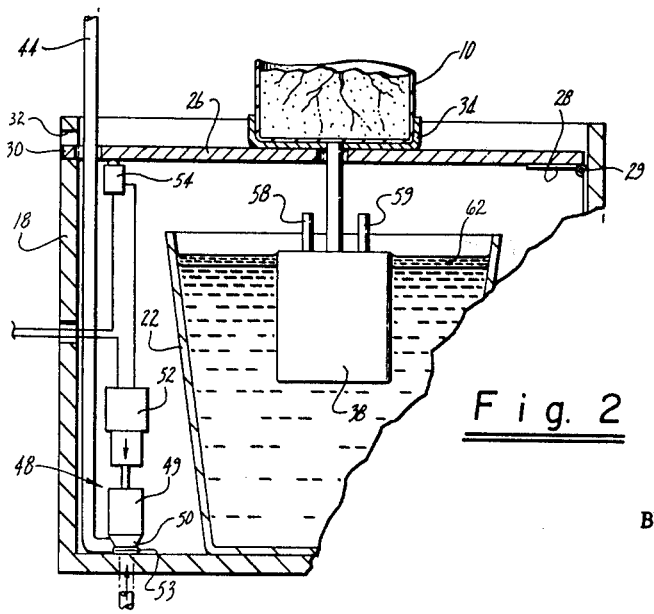

Other objects and advantages of the present invention will be apparent from the following description and from the drawings, in which:

FIGURE 1 is a view in section and elevation of an automatic watering device incorporating my invention; and FIGURE 2 is a like view illustrating the operation of the device.

Generally stated, the present invention solves the problem of maintaining a test sample of soil (i.e., soil, plant and water) at a desired state of moistness or moisture content by employing the weight of water retained by the soil as a means to automatically regulate the flow of additional water to the soil. More specifically, my invention makes use of the difference between the combined weight of a test sample and its moisture content, and the buoyancy of float means supporting said sample above a body of water or other liquid, to regulate valve means controlling the supply of water to the test sample. I have found that such arrangement not only permits the automatic watering of the test sample with a minimum of supervision, but also insures that its moisture content will be maintained within a very narrow range. Preferably, my device is also constructed to permit the ready sterilization of all components, as may be necessary, thereby making it feasible to use a pure or sterile water source.

The invention can be best understood by reference to a specific embodiment thereof, as illustrated in the drawings. Referring specifically to FIGURE 1, 10 indicates a container substantially filled with a test sample of soil 12. The container is suitably constructed of glass, ceramic, plastic, or other material customarily used in agricultural experiments of the type described, as will be understood by one in this art, each sample of soil 12 is employed with a specimen of a test crop, represented in FIGURE 1 by the plant 14. Customary practice is to grow a number of plant specimens in the various test samples of soil, with the various test samples being rotated and moved about in the test area at regular intervals according to a predetermined test plan. The precise procedure will vary somewhat, depending upon the type of samples being tested and the purpose of the test. For example, the described procedure could be employed to determine the nutrient capacities of several different types of soil, or to test the growth rate of several different plant species in the same soil, and so on.

In the illustrated embodiment of the invention, the test apparatus comprises a box frame composed of a bottom 16, sides 18, and a back 20. A receptacle 22 within the frame is substantially filled with water or a similar body of liquid 24. A platform or shelf 26 is supported for movement above the surface of the liquid by a hinge or other suitable pivot means 28 having a pivot axis 29. The free end 30 of the platform is preferably received within an aperture 32 in the opposite side of the box frame, which serves to limit the extent of pivotal movement of the platform about its pivot axis.

The test sample 10 is preferably positioned at a predetermined location on the platform 26 by means of a flanged plate or receptacle 34, which is connected by a rod or similar connecting device 36 to a flat 38 immersed in the body of liquid 24. It will be understood that the vertical position of the test sample 10, and consequently the elevation of the platform or lever 26, is determined by the relative weight of the test sample 10 in relation to the buoyancy of the float 38. To illustrate, the introduction of water to the test sample will naturally increase its weight, and will eventually force the platform 26 and the float 38 into a "down" or lowermost position determined by abutment of the end 30 of the platform against the lower surface of the opening 32. On subsequent evaporation of moisture from the sample, for example, due to the effect of the sun or the surrounding atmosphere, the buoyancy of the float 38 will cause it to lift the platform 26 in a pivotal movement about the axis 29 until such time as the free end of the platform engages the upper surface of the opening 32.

In accordance with the present invention, a source of water (preferably distilled, sterilized, or otherwise freed of contaminants) is provided adjacent the test apparatus. Such a source is shown diagrammatically in the drawings at 42. In the illustrated apparatus, water is supplied to the test sample under hydrostatic or line pressure from the source 42 by means of a conduit 44. The latter may comprise rigid conduit such as glass or metal, or preferably plastic tubing suitably supported to position the discharge end 46 above the level of soil in the test container 10.

Intermediate the ends of the conduit 44, a valve means 48 is provided to interrupt the flow of water to the test sample. In the illustrated apparatus, this valve mechanism comprises a weight 49 supporting a knife edge 50 and capable of vertical movements in response to energization of a solenoid 52. As will be understood, downward movement of the knife edge 50 will cause collapse of the flexible tubing, at 53, to shut off the water supply. Where rigid conduit is employed, a flexible valve section of flexible plastic, rubber or similar material can be positioned in the area 53, immediately below the knife edge.

Referring to FIGURES 1 and 2, the solenoid 52 is connected within an electric switching circuit including the self-closing switch 54. As indicated in FIGURE 2, the switch 54 is positioned to be opened engaged by the platform 26, and when opened, the solenoid 52 is de-energized and weighted knife 50 collapses the water supply conduit, at 53. This position of the parts generally corresponds with a weight of a test sample (soil, plant and water) wherein the moisture content or weight of water retained by the soil 12 is above a minimum desired level. As moisture evaporates from the sample, the buoyancy of the float 38 will gradually cause the platform 26 to lift from the switch 54, in the manner previously described, with the result that the switch 54 eventually opens. Opening of the switch causes the solenoid to lift the weight 49 and knife edge 50 from the collapsed portion of the conduit 44, permitting water to pass through the upper portion of the supply conduit 44 to the sample 10. When a proper amount of water has been introduced (i.e., to re-establish a desired maximum moisture content in the test sample), the weight of the sample again depresses the platform or lever 26 to close the switch 54. In this fashion the system generally functions to supply water when weight of the test sample (soil, plant and water) drops below a predetermined minimum weight, and to shut off the water supply when the weight of water in the sample reaches a maximum value consistent with a desired maximum moisture content.

It is a feature of the present invention that the float 38 is open to the atmosphere, for example through the tubes 58 and 59. This construction avoids the introduction of errors into the system due to changes in barometric pressure or fluctuating air temperatures. It will be understood, if the tubes 58 were omitted, that a change in temperature or barometric pressure would effect a change in the density of the air within the float (relative to the surrounding air) and consequently in the buoyancy of the float 38.

The particular construction of the tubes illustrated (FIGURE 1) also makes possible the adjustment of the float to accommodate varying weights of the test sample 10. Assume, for example, that the apparatus is adjusted to a desired maximum weight of the test sample 10 (soil, plant and water) of a thousand grams, but the test sample actually weighs only 900 grams. As adjusted, the float will provide an excess of buoyancy equivalent to 100 grams. Adjustment can be simply obtained by introducing 100 grams of water by means of a pipette into the interior of the float through the tube 58 or the tube 59, thereby bringing the mechanism back into balance. Should the next text call for a fixed weight of the test sample of 950 grams, the buoyancy of the float would now be 50 grams below the desired value. Adjustment can again be obtained by withdrawing 50 grams of water through the tube 58, employing suction to siphon the desired volume of water into a graduate or other measuring device. In this way the buoyancy of the float can be adjusted between maximum and minimum levels by introducing an appropriate amount into the interior of the float.

As a further refinement, a layer of oil or other liquid of relatively low vapor pressure is preferably spread on the surface of the body of liquid in the receptacle, as represented by the layer of liquid 62 and the line of separation immediately therebelow. Such layer tends to reduce undesired evaporation of the body of liquid 24. Since it is contemplated that the device of the invention will normally be left unattended for relatively long periods of time, the layer 60 tends to avoid inoperativeness of the system through unexpected or excessive evaporation of the liquid 24.

It will be understood that the dry weight of the soil 10 and plant 14 is predetermined (in accordance with procedures well known in this art) to insure that the described variation in the weight of water contained by the sample will correspond to a desired range of moisture content, based on the weight of the soil. For example, assuming a weight of soil equal to 800 grams, and a desired weight of water equal to 200 grams, the variation in sample weight between 940 and 1000 grams will correspond to a moisture content of the soil within the range from about 42% to 60%.

From the foregoing, it will be evident that the present invention makes possible a very efficient watering of a test sample comprising a plant specimen, soil and water, automatically, and with a minimum of human supervision. Once the test sample has been properly weighed and placed on the test platform, the device automatically operates to introduce water when the weight of the sample and retained water drops below a predetermined limit. In like fashion, the device automatically operates to prevent an excess amount of water being introduced to the test sample. The device also has the advantage of operating efficiently regardless of fluctuations in temperature or barometric pressure, or wide variations in the rate of evaporation of moisture from the test sample. The effectiveness of the device is particularly enhanced by the ease with which the various parts can be sterilized, as may be required initially or to prevent contamination during use. The device is therefore highly reliable for use in carrying out agricultural experiments of the type described since it not only insures reproducible conditions from one experiment to the next but also a high degree of accuracy in maintaining desired conditions throughout individual experiments.

A particular advantage of the present invention resides in the tremendous savings possible due to the reduced attendance required by highly skilled personnel, such as laboratory technicians and the like. In contrast, prior systems require constant laboratory attendance to insure that each plant is properly watered and maintained in a moist condition through the period of a test (frequently many months). Prior systems also generally require that the test samples be periodically weighed, to insure that a desired moisture content of the soil is being maintained. The present device and system eliminate the need for such time consuming activity. The device of the invention is also characterized by an extremely simple, inexpensive construction, which adapts it to widespread use.

I claim:

1. In an automatic watering device, a receptacle containing a body of liquid, float means within said body of liquid, platform means supported on said float means for movements above the level of liquid in said receptacle, said platform means being adapted to support a test sample including soil, said float means being provided with conduit means extending from a position just above the lower interior surface of the float to an exterior position above the liquid level in the receptacle whereby water can be introduced into the float to vary its buoyancy in accordance with variations in weight of the test sample, a source of water, additional conduit means leading from said source of water to said test sample, valve means interrupting the flow of water through said additional conduit means, and actuating means responsive to varying vertical positions of said movable platform to control the operation of said valve means, whereby said valve means is operable in response to variations in the weight of said test sample corresponding to variations in its moisture content.

2. A device as in claim 1 wherein said float means is provided with a second conduit means in communication with the surrounding atmosphere and extending from a position just beneath an upper interior surface of the float to an exterior position with respect to the float.

3. In an automatic watering device, a receptacle containing a body of liquid, float means within said body of liquid, platform means supported on said float means for movements above the level of liquid in said receptacle, said platform means being adapted to support a test sample including soil, a source of water, said water being free of contaminants, closed conduit means connected to said source of water and leading to said test sample, valve means positioned exteriorally of said conduit means and operable to interrupt the flow of water through said conduit means without tendency to introduce contaminants, and actuating means responsive to varying vertical positions of said movable platform to control the operation of said valve means, whereby said valve means is operable in response to variations in the weight of said test sample corresponding to variations in its moisture content.

References Cited in the file of this patent
UNITED STATES PATENTS

| | | |
|---|---|---|
| 1,555,675 | Kruszynski | Sept. 29, 1925 |
| 2,462,216 | Nowak | Feb. 12, 1949 |
| 2,896,374 | Perin | July 28, 1959 |

OTHER REFERENCES

Chemical Abstracts, vol. 53, columns 19266 and 19267, published Oct. 25, 1959, article "Agents for Increasing the Temperature and Decreasing the Evaporation."